United States Patent
Dahan et al.

(10) Patent No.: US 12,086,298 B2
(45) Date of Patent: *Sep. 10, 2024

(54) BLURRING AND UNBLUR VIDEOS AND PHOTOS IN CHATS OF COMMUNICATION APPLICATIONS BY USING A PAYMENT LINK

(71) Applicants: Meir Dahan, Tveria (IL); Eliahu Antopolsky, Zichron Yaakov (IL)

(72) Inventors: Meir Dahan, Tveria (IL); Eliahu Antopolsky, Zichron Yaakov (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,471

(22) Filed: Sep. 30, 2023

(65) Prior Publication Data
US 2024/0028778 A1    Jan. 25, 2024

Related U.S. Application Data

(63) Continuation-in-part of application No. 18/092,479, filed on Jan. 3, 2023, now Pat. No. 11,853,467, which is a continuation-in-part of application No. 17/746,966, filed on May 18, 2022, now Pat. No. 11,586,767, which is a continuation-in-part of application No. 16/879,759, filed on May 21, 2020, now abandoned.

(51) Int. Cl.
| | |
|---|---|
| *G06F 21/84* | (2013.01) |
| *G06F 21/60* | (2013.01) |
| *G06Q 20/32* | (2012.01) |
| *G06T 5/70* | (2024.01) |
| *G06T 5/73* | (2024.01) |

(52) U.S. Cl.
CPC ............ *G06F 21/84* (2013.01); *G06F 21/604* (2013.01); *G06Q 20/322* (2013.01); *G06T 5/70* (2024.01); *G06T 5/73* (2024.01); *G06T 2200/24* (2013.01); *G06T 2207/10016* (2013.01)

(58) Field of Classification Search
CPC ............ G06F 3/04845; G06F 3/04842; H04N 21/8153; H04N 21/41407; H04N 21/4788
See application file for complete search history.

(56) References Cited

U.S. PATENT DOCUMENTS

| | | | |
|---|---|---|---|
| 7,996,469 B1 * | 8/2011 | Wang | H04L 51/04 |
| | | | 709/204 |
| 9,608,964 B2 * | 3/2017 | Stutch | H04L 63/105 |
| 9,979,684 B2 * | 5/2018 | Sayko | H04N 21/4223 |
| 10,931,728 B1 * | 2/2021 | Barnett | G06T 5/73 |

(Continued)

*Primary Examiner* — Esther B. Henderson

(57) ABSTRACT

A method for managing privacy of videos and photos recorded through a communication application by displaying a recording button on the screen of the user's mobile device, recording the video or photo and displaying it in the chat of the user and the contact, displaying on the user's mobile device a blur button that is associated with the video or photo, applying on the video or photo a blur mode for blurring the video or photo, displaying on the user's mobile device an unblur button that is associated with the blurred video or photo, applying an unblur mode on the blurred video or photo by using the unblur button on the user's mobile device or displaying on the screen of the contact's mobile device a payment link and applying the unblur mode upon making the payment.

1 Claim, 2 Drawing Sheets

(56) References Cited

U.S. PATENT DOCUMENTS

| | | | | |
|---|---|---|---|---|
| 2015/0172238 A1* | 6/2015 | Ahmed | ............. | H04N 21/4788 |
| | | | | 709/217 |
| 2015/0242104 A1* | 8/2015 | Stokman | ............. | G11B 27/031 |
| | | | | 707/706 |
| 2016/0294750 A1* | 10/2016 | Ansari | ................ | G06F 3/04845 |
| 2018/0019962 A1* | 1/2018 | Sayko | ............. | H04N 21/23614 |
| 2018/0063582 A1* | 3/2018 | Cummins | ............... | H04N 7/14 |
| 2019/0182549 A1* | 6/2019 | Grossman | ......... | H04N 21/4627 |
| 2020/0026783 A1* | 1/2020 | Watanabe | ............ | G06F 16/176 |
| 2020/0403956 A1* | 12/2020 | Adamski | .............. | H04L 51/216 |

\* cited by examiner

BLURRING AND UNBLUR VIDEOS AND PHOTOS IN CHATS OF COMMUNICATION APPLICATIONS BY USING A PAYMENT LINK

RELATED APPLICATIONS

This application is a continuation in part of U.S. patent application Ser. No. 18/092,479 filed on Jan. 3, 2023, which is a continuation in part of U.S. patent application Ser. No. 17/746,966 filed on May 18, 2022, which is a continuation in part of U.S. patent application Ser. No. 16/879,759 filed on May 21, 2020.

TECHNICAL FIELD

The present invention refers to a method for managing and protecting privacy of videos and photos recorded through a communication application.

BACKGROUND ART

Many users of mobile devices like to send to each other photos, video files or audio files. Sometimes the user wants to send to his contact such a file that contains sensitive information that the user would prefer that the contact will be unable to save the file, to forward it and to make a screenshot or screen recordation of the photo or the video. In addition, users of mobile devices are afraid to take pictures or to make videos of certain situations because they know that the files of these photos and videos are saved on the mobile device and third person can see them, even if they delete the files from the phone, and hackers or authorities may access their mobile and expose those files. The present invention provides a solution for such problems.

In addition to that, there is a specific need to protect the privacy of photos and videos including video recordings of video calls (video conversations) and to give the user an exclusive control on the ability to view them by the contact.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

The term "mobile device" refers to any kind of mobile device, smartphone, tablet or a computer that is designed to have an internet connection and a camera. The term "processing device" refers to a processing device on a server or on the mobile devices, or both.

The main object of the present invention is to provide a method for managing and protecting privacy of recorded videos and photos that is performed by processing devices (10) running on a mobile device (100) of a user, on a mobile device (200) of a contact of a communication application and possible also on a server (300).

It is possible to implement the present invention to several kinds of files, such as files of video films, files of audio recordings and photographs files, and the terms "video" and "photo" hereinafter and in the claims refers to video films, photos and audio recordings, and the term "shooting" means also taking or recording. In addition to that, the term "video" hereinafter and in the claims refers to video recordings and also to video conversations that are recorded and displayed in the chat so that this method applies also on recorded video conversation.

Figure 1:
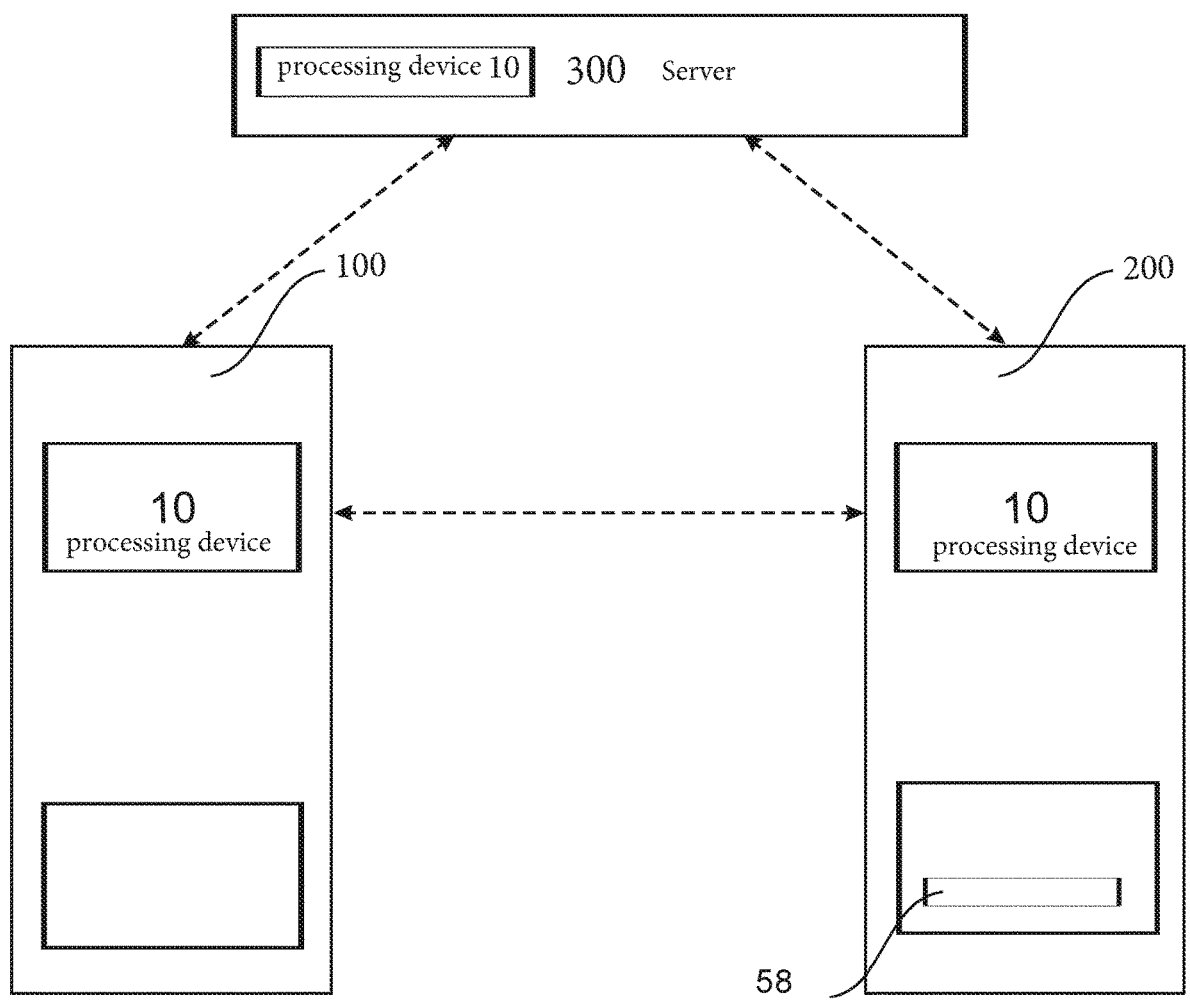
FIG. 1 is a block diagram that shows the mobile device of the user (100), the mobile device of the contact (200) and the server (300), each one of them with a processing device (10).
Figure 2:
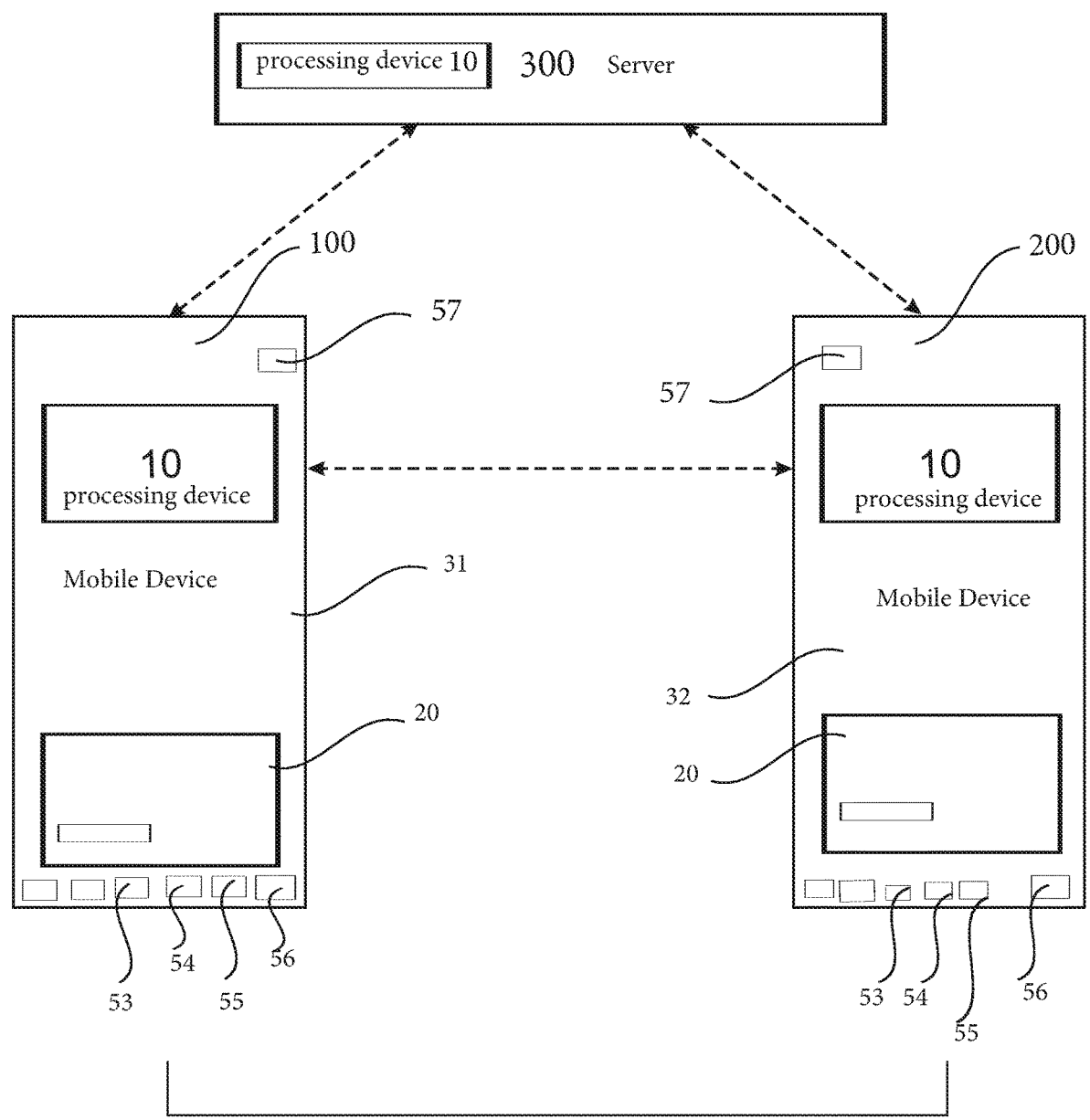
FIG. 2 depicts the mobile devices of the user (100) and the contact (200) with the blur and unblur buttons.

FIG. 1 depicts schematically the mobile devices of the user (100), of the contact (200) and the server (300), each one of them with a processing device (10), and FIG. 2 depicts the mobile devices of the user (100) and the contact (200) with the recording, blur and unblur buttons and the payment link.

The present invention refers to a method for managing privacy of a video or a photo recorded through a communication application that is performed by processing devices running on the mobile devices of the user and the contact of the communication application. The method may include one or more of the following features:

(a) Displaying a first button (53) on the touch screen (31) of the user's mobile device (100).

(b) Recording a video or a photo that is designed to be displayed in the chat (message box) (20) of the user and the contact in the communication application. The recording can be executed by using the first button.

(c) Displaying in the chat the recorded video or photo that can be viewed on the screens of the mobile devices of the user and the contact.

(d) Displaying on the screen of the user's mobile device a second button (54) that is configured to be associated with the recorded video or photo. In this way, the user has a full control over the video or photo and the contact has no ability to control the video or photo in the blurring sense. The second button that applies the blur mode can be unified with the first button that execute the video recording so that the bluer mode may be applied automatically on the recorded video or photo, immediately or after a certain period of time that the user may set through the communication application or after several views of the video or photo on the mobile device of the contact.

The terms "blur" and "unblur" in this disclosure and in the claims also includes the option of preventing the viewing of the video (when the video or photo is a video) so that the term "blur" includes the option of preventing the video to run or to be viewed and the term "unblur" includes the option of enabling the video to run and to be viewed. The terms "blur" and "unblur" in this disclosure and in the claims also includes blur and unblur in whole or in part.

(e) Applying on the recorded video or photo a blur mode that is applied by using the second button on the user's screen, manually or automatically as explained above. The application of the blur mode on the recorded video or photo is configured to blur the recorded video or photo. The target is to enable only the user to blur the videos and photos that are displayed in the chat so that the user can take videos and photos by using the first button on his mobile device so that the videos and photos can be blurred by the user only. Indeed, it is possible to enable the contact also to blur the video or photo but it seems unnecessary.

(f) Displaying on the screen of the user's mobile device a third button (55) that is configured to be associated with the blurred video or photo.

(g) Applying on the blurred recorded video or photo an unblur mode that is applied on the blurred recorded video or photo by using the third button (55) on the screen of the user's mobile device. The application of the unblur mode is configured to unblur the blurred recorded video or photo so that the recorded video or photo can be viewed or reviewed on the mobile device of the contact.

The user may wish to control the viewing of the videos and photos and even to charge payments for that, and in another embodiment, the method includes a step of displaying on the screen (32) of the contact's mobile device a payment link (58) for processing a payment that is configured to be associated with the blurred video or photo, and applying an unblur mode on the blurred video or photo upon making the payment by using the payment link. The application of the unblur mode is configured to unblur the blurred video or photo for enabling the recorded video or photo to be viewed again on the mobile device of the contact. A link for processing a payment through communication applications is a known payment solution method, and it works by sharing the payment link with contacts and customers, and upon their click, they get redirected to a secure page to complete the payment and the transaction. Once the payment is completed and confirmed, the payment solution method sends a confirmation, and in our case sends the command and applies the unblur mode. The user of the communication application can generate a payment request and share it as a payment link for the contact through the chat conversation and the user may have the option to set the exact amount of the payment. The contact receives the link of the payment request within the chat. The contact may select preferred payment method such as bank transfers, credit or debit cards, or mobile wallets, and the like for processing the payment. The video or photo may be designed to be viewed or reviewed for a certain number of times or for a certain period of time upon making the payment, and it is possible that in the end of that certain number of times or that certain period of time the blur mode is re-applied on the video or photo.

The method may further includes the steps of displaying a privacy button (56) on the screen of the user's mobile device, and applying on the recorded video or photo a privacy mode that is applied by using the privacy button (56). The application of the privacy mode on the recorded video or photo can be also automatically without using any button and is configured disable a possibility of the mobile device of the contact to execute a screenshot and screen recording of the recorded video or photo, to disable a possibility to save the recorded video or photo in the its gallery (57), and to disable a possibility of the mobile devices to share and forward the recorded video or photo.

It should be noted that it is possible that one icon will serve as two or more buttons and the touch screen itself can be used and served as all the buttons or part pf them by tapping on the screen, sliding fingers on it and the like. For example, the second button (54) after being activated (after blurring the video or the photo) can be changed and looks differently and serve as the third button (55). In addition, the buttons can be hidden in the meaning that the function of the buttons can be done simply by tapping on the touch screen or on part of it or sliding fingers. For example, tapping twice on the video or photo will blur it and tapping twice on the blurred video or photo will unblur it.

What is claimed is:

1. A method for managing privacy of a video or a photo recorded through a chat between a user and a contact of a communication application that is performed by processing devices running on mobile devices of the user and the contact, said method comprising:

displaying a first button on a screen of the user's mobile device that is configured to record the video or photo, wherein said video or photo is designed to be displayed in the chat of the user and the contact in the communication application;

displaying in said chat the video or photo that was recorded by the user's mobile device wherein said video or photo is designed to be viewed on the screen of the user's mobile device and on a screen of the contact's mobile device;

displaying on the screen of the user's mobile device a second button that is configured to be associated with the recorded video or photo;

wherein said video or photos that was recorded by the user's mobile device and is displayed in said chat is designed to be blurred only by the second button on the screen of the user's mobile device;

applying on the recorded video or photo a blur mode by using the second button on the screen of the user's mobile device, wherein the application of the blur mode on the recorded video or photo is configured to blur the recorded video or photo on the mobile device of the contact;

displaying on the screen of the user's mobile device a third button that is configured to be associated with the blurred video or photo;

wherein said blurred video or photos that is displayed in said chat is designed to be unblur only by the third button on the screen of the user's mobile device; and applying an unblur mode on the blurred video or photo by using the third button on the screen of the user's mobile device; wherein the application of the unblur mode is configured to unblur the blurred video or photo for enabling the recorded video or photo to be rewatch on the mobile device of the contact.

* * * * *